United States Patent
Takazawa

(10) Patent No.: US 6,924,972 B2
(45) Date of Patent: Aug. 2, 2005

(54) MONOLITHIC CERAMIC ELECTRONIC COMPONENT AND METHOD FOR MANUFACTURING MONOLITHIC CERAMIC ELECTRONIC COMPONENT

(75) Inventor: Tomoo Takazawa, Shiga-ken (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 0 days.

(21) Appl. No.: 10/891,710

(22) Filed: Jul. 15, 2004

(65) Prior Publication Data

US 2005/0018382 A1 Jan. 27, 2005

(30) Foreign Application Priority Data

Jul. 15, 2003 (JP) ........................................ 2003-197342

(51) Int. Cl.[7] ................................................ H01G 4/06
(52) U.S. Cl. .................... 361/321.2; 361/311; 361/312; 361/321; 29/25.41
(58) Field of Search ......................... 361/303, 311–313, 361/320, 328–329; 29/25.41, 25.42

(56) References Cited

U.S. PATENT DOCUMENTS 5,522,717 A * 6/1996 Matsumoto et al. .......... 425/84
6,582,796 B1 * 6/2003 Joulin et al. ................ 428/116

FOREIGN PATENT DOCUMENTS

JP          55-52300        4/1980
JP          09-238906       9/1997

* cited by examiner

*Primary Examiner*—Anthony Dinkins
(74) *Attorney, Agent, or Firm*—Keating & Bennett, LLP

(57) ABSTRACT

A monolithic ceramic component includes a coil-including region formed by stacking ceramic green sheets for defining inner layers having a porosity of about 30% to about 80%, and outer layer regions formed by stacking ceramic green sheets for defining outer layers have a porosity of about 10% or less. Outer electrodes are provided on the right end surface and the left end surface of a sintered ceramic laminate. That is, the outer electrodes are provided on the main surfaces of outermost ceramic sheets for outer layers.

22 Claims, 4 Drawing Sheets

MONOLITHIC CERAMIC ELECTRONIC COMPONENT AND METHOD FOR MANUFACTURING MONOLITHIC CERAMIC ELECTRONIC COMPONENT

BACKGROUND OF THE INVENTION

1. Field of the Invention

The present invention relates to monolithic ceramic electronic components, and more particularly, the present invention relates to monolithic ceramic electronic components such as monolithic inductors, monolithic capacitors, and LC combined monolithic components, and a method for manufacturing such a monolithic ceramic electronic component.

2. Description of the Related Art

In recent years, electronic devices operating at high frequencies have become common. Inductors, LC combined components, LR combined components, LCR combined components, and the like, which can operate at gigahertz (GHz) frequencies, are required.

However, in an inductor for high-frequency operation, stray capacitance in parallel with the inductor seriously affects the impedance of the inductor. In particular, at GHz frequencies, small stray capacitance on the order of 0.01 pF to 0.1 pF seriously affects the impedance. Consequently, to achieve a desired characteristic by decreasing the stray capacitance, decreasing the dielectric constant $\epsilon$ of ferrite for a magnetic material is required. Unfortunately, decreasing the dielectric constant $\epsilon$ of ferrite by, for example, 14 to 13 or less is difficult practically because of the structure of ferrite.

Thus, a method for decreasing the dielectric constant by mixing a magnetic material with a material such as a resin and glass having a low dielectric constant has been suggested. In such a magnetic composite that is composed of a magnetic material and a non-magnetic material such as a resin and glass, the particles of the magnetic material are covered with the non-magnetic material to interrupt a magnetic path. As a result, permeability is decreased dramatically.

Japanese Unexamined Patent Application Publication No. 55-52300 discloses porous sintered ferrite having a porosity of 20% to 70% for an electromagnetic wave absorber, the porous sintered ferrite having a low dielectric constant because of its high porosity. Since such a porous sintered ferrite has continuous magnetic paths, the electromagnetic properties of the porous sintered ferrite do not vary steeply. That is, even when the porous sintered ferrite has a high porosity, ferrite grains are magnetically coupled to each other. As a result, the variation in the frequency dispersion of the complex permeability of ferrite decreases compared with that of a ferrite composite prepared by mixing ferrite powder and an insulating material.

Japanese Unexamined Patent Application Publication No. 11-67575 discloses a ceramic electronic component provided with ceramic and inner electrodes disposed within the ceramic, the ceramic having pores with a diameter of 1 $\mu$m to 3$\mu$m and having a porosity of 3 to 30 percent by volume. The pores can decrease the dielectric constant of the ceramic to improve the impedance characteristics of the ceramic electronic component.

When sintered ceramic such as ferrite includes pores, in forming outer electrodes by applying an electrode paste, the paste diffuses into the inside of the sintered ceramic through the pores. As a result, the outer electrodes subside causing deterioration of the mechanical strength and the electrical connection reliability of the outer electrodes. In addition, since the pores are provided in the entire sintered ceramic, if the sintered ceramic is made of ferrite, the magnetic permeability decreases. Consequently, when the sintered ferrite includes a coil element, leakage flux increases, and thus, high impedance cannot be achieved.

SUMMARY OF THE INVENTION

To overcome the problems described above, preferred embodiments of the present invention provide a monolithic ceramic electronic component in which the strength and reliability of the outer electrodes do not deteriorate and leakage flux is low, and also provide a method for manufacturing such a novel monolithic ceramic electronic component.

A monolithic ceramic electronic component according to a preferred embodiment of the present invention includes a ceramic laminate having a plurality of ceramic layers and a plurality of inner electrodes, and outer electrodes, each of the outer electrodes being provided on the corresponding main surface of an outermost ceramic layer in the ceramic laminate, the plurality of ceramic layers including pores, the porosity of at least the outermost ceramic layers of the ceramic laminate being lower than that of the other ceramic layers.

The outermost ceramic layers of the ceramic laminate preferably have a porosity of about 10 percent by volume or less.

Since the monolithic ceramic electronic component described above has outermost layers with a relatively low porosity, the paste applied for the outer electrodes hardly diffuses into the inside of the sintered ceramic laminate through the pores during a process of forming the outer electrodes.

Since the ferrite ceramic layers with low porosity have high magnetic permeability, when sintered ferrite includes a coil element within the sintered ferrite, leakage flux decreases. As a result, high impedance can be achieved at low frequencies.

According to another preferred embodiment of the present invention, a method for manufacturing a monolithic ceramic electronic component, includes the steps of preparing first ceramic sheets for defining outer layers, each of the first ceramic sheets being composed of a ceramic material and a binder; preparing second ceramic sheets for defining inner layers, each of the second ceramic sheets being composed of a ceramic material, a binder, and a pore-forming agent; forming inner electrodes, each of the inner electrodes being formed on a surface of the corresponding second ceramic sheet; forming a ceramic laminate by stacking the first ceramic sheets and the second ceramic sheets; and forming outer electrodes, each of the outer electrodes being formed on a corresponding outer surface of the outermost ceramic sheet of the ceramic laminate.

According to the method, a monolithic ceramic electronic component provided with a ceramic laminate in which the porosity of the ceramic sheets for the outer layers is lower than that of the ceramic sheets for the inner layers can be efficiently manufactured.

Other features, elements, steps, characteristics and advantages of the present invention will become more apparent from the following detailed description of preferred embodiments thereof with reference to the attached drawings.

DETAILED DESCRIPTION OF PREFERRED EMBODIMENTS

Preferred embodiments of the present invention including a monolithic ceramic electronic component and a method for manufacturing a monolithic ceramic electronic component will now be described below with reference to the drawings. In a first preferred embodiment, a monolithic inductor will be described as an example of the monolithic ceramic electronic component, however, the present invention is not limited thereto.

Figure 1:
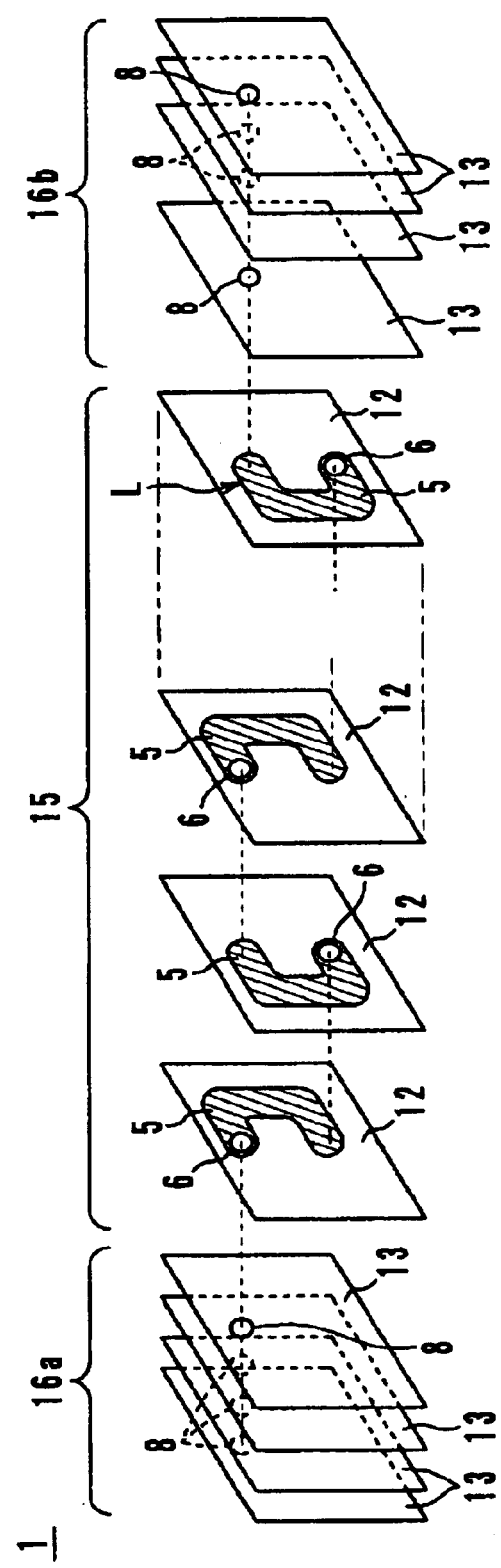
FIG. 1 is an exploded perspective view of a monolithic ceramic electronic component according to a preferred embodiment of the present invention.

As shown in FIG. 1, a monolithic inductor 1 includes ceramic green sheets 12 for forming inner layers and ceramic green sheets 13 for forming outer layers, each of the ceramic green sheets 12 providing a via hole 6 for interlayer connection and a conductive pattern 5 for forming a coil, each of the ceramic green sheets 13 providing a lead via hole 8.

The ceramic green sheets 13 for forming the outer layers are preferably prepared by the following process: Nickel oxide, zinc oxide, and copper oxide are mixed and calcined at a temperature of about 800° C. for an hour, for example. And then, the resulting mixture is ground using a ball mill followed by drying, to prepare a Ni—Zn—Cu based ferrite material (oxide mixed powder) having an average particle size of about 2 $\mu$m.

This ferrite material, a solvent, a binder, and a dispersant are mixed to a slurry. Then, the ceramic green sheets 13 having a thickness of about 40 $\mu$m, for example, are prepared with the resulting slurry by a doctor blade process.

The ceramic green sheets 12 for forming the inner layers are preferably prepared by the following process: Nickel oxide, zinc oxide, and copper oxide are mixed and calcined at a temperature of about 800° C. for an hour, for example. And then, the resulting mixture is ground with ball mill followed by drying, to prepare a Ni—Zn—Cu based ferrite material (oxide mixed powder) having an average particle size of about 2 $\mu$m, for example.

This resulting ferrite material, a spherical polymer which is, for example, a spherical pore-forming agent made of cross-linked polystyrene having an average particle size of, for example, about 8 $\mu$m (commercially available), a solvent, a binder, and a dispersant are mixed to a slurry. In this preferred embodiment, TECHPOLYMER (manufactured by SEKISUI PLASTICS CO.LTD) is preferably used for the pore-forming agent. And then, the ceramic green sheets 12 having a thickness of about 40 $\mu$m are prepared with the resulting slurry by a doctor blade process. The pore-forming agent is thermally decomposed during a firing process to form pores.

The conductive pattern 5 composed of silver (Ag), palladium (Pd), copper (Cu), gold (Au), or an alloy made of these metals is preferably formed by screen printing. The via holes 6 and 8 are formed by a laser beam, and then the via holes 6 and 8 are filled with a conductive paste preferably composed of Ag, Pd, Cu, Au, or an alloy made of these metals.

The conductive patterns 5 are electrically connected to each other in series through the via holes 6 to form a helical coil L. The ends of the helical coil L are electrically connected to leads through the lead via holes 8.

Figure 2:
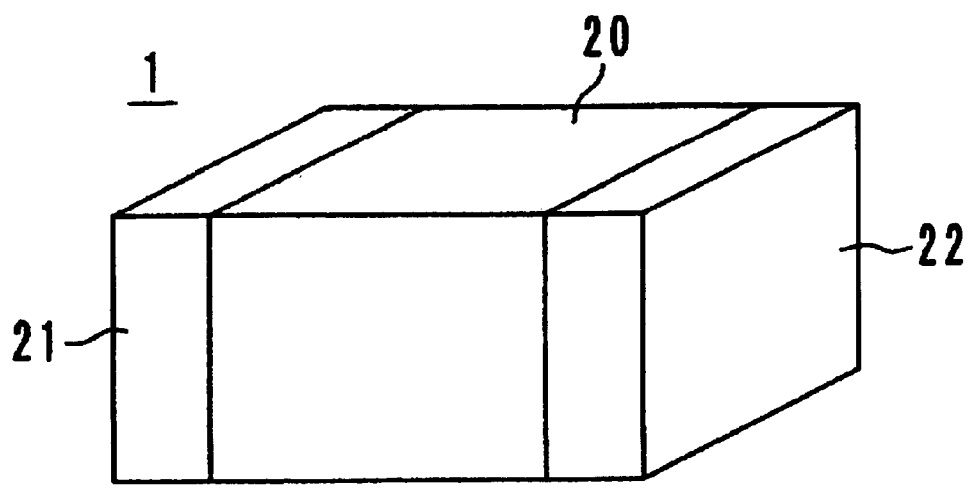
FIG. 2 is a schematic perspective view of the monolithic ceramic electronic component shown in FIG. 1.

As shown in FIG. 2, the ceramic green sheets 12 and 13 are stacked and crimped to form a ceramic green laminate. And then, the resulting ceramic green laminate is subjected to heat treatment at a temperature of about 400° C. for three hours (debinder treatment) and subsequent heat treatment at a temperature of about 925° C. for two hours, for example, to prepare a sintered ceramic laminate 20.

Thus, a coil-including region 15, which is formed by stacking the ceramic green sheets 12, includes many pores 32 (see FIG. 3) having an average diameter of about 5 $\mu$m to about 20 $\mu$m, for example. The coil-including region 15 preferably has a porosity of about 30% to about 80%. The porosity of the coil-including region 15 is determined by the following equation:

$$P_{15} = \{1 - (W/V)/G\} \times 100(\%)$$

where $P_{15}$ is the porosity of the coil-including region 15; W is the total weight of only the sintered ceramic sheets in the coil-including region 15; V is the total volume of only the sintered ceramic sheets in the coil-including region 15; and G is the theoretical density of a ferrite, with the proviso that the weight of air in the pores is ignored.

When the porosity is 30% or less, the dielectric constant increases. On the other hand, when the porosity is 80% or more, the mechanical strength of the coil-including region 15 decreases. As a result, a resin impregnation step, which is a later step, is difficult to perform.

Outer layer regions 16a and 16b, which are formed by stacking the ceramic green sheets 13, also have pores. The pores result from air bubbles trapped in the slurry during slurry preparation and from volatile constituents in the binder and the dispersant. Note that the outer layer regions 16a and 16b have a small number of pores and a porosity of about 10% or less. The porosity of the outer layer regions 16a or 16b is given by the following equation:

$$P_{16a(or\ 16b)} = \{1 - (W_{16a(or\ 16b)}/V_{16a(or\ 16b)})/G\} \times 100(\%)$$

where $P_{16a(or\ 16b)}$ is the porosity of the outer layer regions 16a (or 16b); $W_{16a(or\ 16b)}$ is the total weight of only the sintered ceramic sheets in the outer layer region 16a (or 16b); $V_{16a(or\ 16b)}$ is the total volume of only the sintered ceramic sheets in the outer layer region 16a (or 16b); and G is the theoretical density of ferrite.

The coil-including region 15, and the outer layer regions 16a and 16b include open pores and closed pores. In this preferred embodiment, the outer layer regions 16a and 16b are each composed of four ceramic green sheets 13, which have a low porosity. However, the ceramic green sheets 13 need not be used for all the ceramic green sheets in the outer layer regions 16a and 16b. That is, the ceramic green sheets 13 may be used for at least the outermost layers in the outer layer regions 16a and 16b of the ceramic laminate 20.

As shown in FIG. 2, outer electrodes 21 and 22 are formed on the left end surface and the right end surface of the ceramic laminate 20, respectively. In other words, the outer electrodes 21 and 22 are formed on the main surfaces of the outermost layers in the outer layer regions 16a and 16b, respectively. The outer electrodes 21 and 22 also extend from the end surfaces to the four side surfaces of the outer layer regions 16a and 16b. The outer electrodes 21 and 22 are preferably formed by baking after application. The outer layer regions 16a and 16b disposed at the ends of the sintered ceramic laminate 20 have low porosity. As a result, the paste applied for the outer electrodes hardly diffuses into the inside of the sintered ceramic laminate 20 through the pores.

As a result, the outer electrodes 21 and 22 hardly subside thus improving the mechanical strength and the electrical connection reliability of the outer electrodes 21 and 22. Since the paste is applied to the surfaces of the outer layer regions 16a and 16b having low porosity, the solvent in the paste cannot penetrate into the sintered ceramic laminate 20. Thus, the shape of the outer electrodes 21 and 22 is stabilized. The outer electrodes 21 and 22 connect to the leads through lead via holes 8.

Next, the sintered ceramic laminate 20 is impregnated in an epoxy-based resin having a dielectric constant of about 3.4, for example. The pores are filled with the epoxy-based resin. All the surfaces of the sintered ceramic laminate 20 are also covered with the epoxy-based resin. And then, the epoxy-based resin is cured at a temperature of about 150° C. to about 180° C. for two hours. Since the baking temperature of the outer electrodes 21 and 22 is around 850° C., the outer electrodes 21 and 22 are preferably baked before the resin impregnation.

Figure 3:
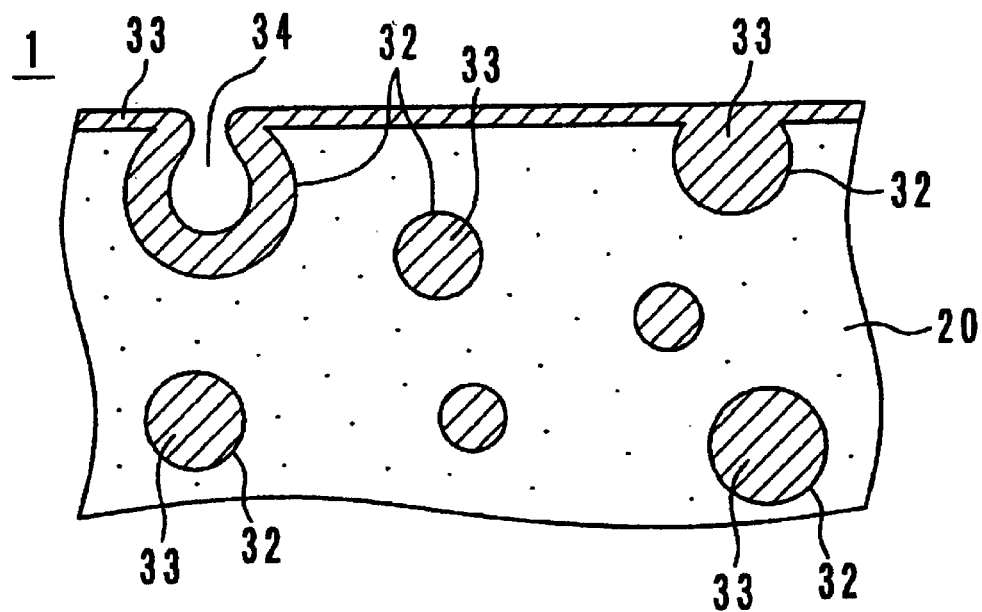
FIG. 3 is an enlarged partial sectional view schematically illustrating a ceramic layer of the monolithic ceramic electronic component shown in FIG. 2.

FIG. 3 is an enlarged partial cross-sectional view illustrating the coil-including region 15 of the sintered ceramic laminate 20. The sintered ceramic laminate 20 includes a plurality of pores 32. The surfaces of the sintered ceramic laminate 20 are covered with the epoxy-based resin 33. The pores 32 are filled with the epoxy-based resin 33. In fact, about 30% to about 70% of the total volume of pores 32 are filled with the epoxy-based resin 33. That is, each of the pores 32 may be fully or partially filled with the epoxy-based resin 33. When one of the pores is partially filled with the epoxy-based resin 33, the surface of the pore is coated by the epoxy-based resin 33 to form a further pore 34.

Figure 4:
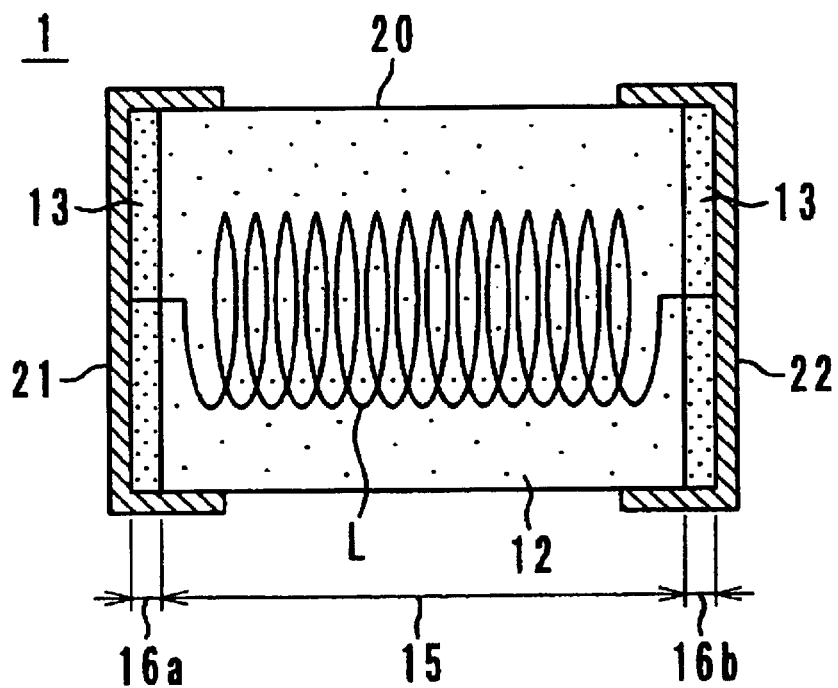
FIG. 4 is a schematic cross-sectional view of the monolithic ceramic electronic component shown in FIG. 2.

The sintered ceramic laminate 20 impregnated with the epoxy-based resin 33 is subjected to barrel polishing to expose the surfaces of the outer electrodes 21 and 22. And then, the surfaces of the outer electrodes 21 and 22 are plated with nickel and tin to form plated layers. Thus, the monolithic inductor 1 is prepared as shown in FIG. 4.

In the monolithic inductor 1 described above, the outer layer regions 16a and 16b composed of ferrite with low porosity have high magnetic permeability. Consequently, magnetic flux generated by the helical coil L easily passes through the outer layer regions 16a and 16b and can hardly leak outside of the monolithic inductor 1. As a result, the monolithic inductor 1 has higher impedance at low frequencies.

The ceramic green sheets 13 having low porosity can be inexpensively manufactured compared with general ceramic green sheets having high porosity. Thus, the manufacturing cost of the monolithic inductor 1 can be reduced.

The present invention is not restricted to the preferred embodiments described above, but can be variously modified within the scope of the present invention. The monolithic ceramic electronic components involve impedance components, monolithic LC filters, monolithic capacitors, and monolithic transformers in addition to monolithic inductors. Functional ceramic materials, for example, magnetic ceramic, dielectric ceramic, semiconductive ceramic, and piezoelectric ceramic can be applied.

In the above-described preferred embodiments, the monolithic inductor is individually manufactured. For mass production, however, a laminate block including a plurality of laminated inductors may be applied.

The method for manufacturing the monolithic ceramic electronic components is not limited to a process in which ceramic sheets having conductive patterns with via holes are stacked and then integrally fired. Either green or fired ceramic sheets may be used for the ceramic sheets. Alternatively, the monolithic ceramic electronic components may be manufactured by the following process: a ceramic paste is applied by printing to form a ceramic layer. A conductive paste is applied on the ceramic layer to form a conductive pattern. Then, a via hole is formed. Furthermore, a ceramic paste is applied on the conductive pattern to form a ceramic layer. In this way, the monolithic ceramic electronic component is manufactured by repeatedly performing these steps in that order.

The present invention is not limited to each of the above-described preferred embodiments, and various modifications are possible within the range described in the claims. An embodiment obtained by appropriately combining technical features disclosed in each of the different preferred embodiments is included in the technical scope of the present invention.

What is claimed is:

1. A monolithic ceramic electronic component comprising:
    a ceramic laminate including a plurality of ceramic layers and a plurality of inner electrodes; and
    outer electrodes, each of the outer electrodes being provided on a corresponding main surface of an outermost ceramic layer of the ceramic laminate, the plurality of ceramic layers having pores, a porosity of at least the outermost ceramic layers of the ceramic laminate being lower than that of the other ceramic layers.

2. The monolithic ceramic electronic component according to claim 1, wherein the outermost ceramic layers of the ceramic laminate have a porosity of about 10 percent by volume or less.

3. The monolithic ceramic electronic component according to claim 1, wherein a stacking direction of the plurality of ceramic layers in the ceramic laminate is substantially parallel to a mounting surface of the monolithic ceramic electronic component.

4. The monolithic ceramic electronic component according to claim 1, wherein the ceramic layers are made from a Ni—Zn—Cu based ferrite material having an average particle size of about 2 $\mu$m.

5. The monolithic ceramic electronic component according to claim 1, wherein the outermost ceramic layers of the ceramic laminate include a pore-forming agent.

6. The monolithic ceramic electronic component according to claim 5, wherein the pore forming agent is made of cross-linked polystyrene having an average particle size of about 8 $\mu$m.

7. The monolithic ceramic electronic component according to claim 1, wherein the ceramic laminate includes a coil-including region including a plurality of pores having an average diameter of about 5 $\mu$m to about 20 $\mu$m.

8. The monolithic ceramic electronic component according to claim 7, wherein the coil-including region has a porosity of about 30% to about 80%.

9. The monolithic ceramic electronic component according to claim 1, wherein the ceramic laminate is covered by an epoxy-based resin having a dielectric constant of about 3.4 except at locations of the outer electrodes.

10. The monolithic ceramic electronic component according to claim 1, wherein the monolithic ceramic electronic component is one of an impedance component, an LC filter, a capacitor, a monolithic transformer, and a monolithic inductor.

11. The monolithic ceramic electronic component according to claim 1, wherein the plurality of ceramic layers are made from at least one of a magnetic ceramic material, a dielectric ceramic material, a semiconductive ceramic material, and a piezoelectric ceramic material.

12. A method for manufacturing a monolithic ceramic electronic component, comprising the steps of:
- preparing first ceramic sheets for defining outer layers, each of the first ceramic sheets including a ceramic material and a binder;
- preparing second ceramic sheets for defining inner layers, each of the second ceramic sheets including a ceramic material, a binder, and a pore-forming agent;
- forming inner electrodes, each of the inner electrodes being formed on a surface of a corresponding one of the second ceramic sheets;
- forming a ceramic laminate by stacking the first ceramic sheets and the second ceramic sheets; and
- forming outer electrodes, each of the outer electrodes being formed on a corresponding outer surface of the outermost ceramic sheet of the ceramic laminate.

13. The method according to claim 12, wherein the step of preparing the first ceramic sheets includes preparing a Ni—Zn—Cu based ferrite material having an average particle size of about 2 $\mu$m, mixing the ferrite material, a solvent, the binder and a dispersant to a slurry, and using a doctor blade to form the slurry into the first ceramic sheets.

14. The method according to claim 12, wherein the step of preparing the second ceramic sheets includes preparing a Ni—Zn—Cu based ferrite material having an average particle size of about 2 $\mu$m, mixing the ferrite material, the pore-forming agent, a solvent, the binder and a dispersant to a slurry, and using a doctor blade to form the slurry into the second ceramic sheets.

15. The method according to claim 12, wherein the pore-forming agent is a spherical pore-forming agent made of cross-linked polystyrene having an average particle size of about 8 $\mu$m.

16. The method according to claim 12, wherein the first ceramic sheets defining the outer layers have a porosity of about 10 percent by volume or less.

17. The method according to claim 12, wherein a stacking direction of the plurality of ceramic layers in the ceramic laminate is substantially parallel to a mounting surface of the monolithic ceramic electronic component.

18. The method according to claim 12, wherein the ceramic laminate includes a coil-including region including a plurality of pores having an average diameter of about 5 $\mu$m to about 20 $\mu$m.

19. The method according to claim 18, wherein the coil-including region has a porosity of about 30% to about 80%.

20. The method according to claim 12, further comprising the step of covering the ceramic laminate by an epoxy-based resin having a dielectric constant of about 3.4 except at locations of the outer electrodes.

21. The method according to claim 12, wherein the monolithic ceramic electronic component is one of an impedance component, an LC filter, a capacitor, a monolithic transformer, and a monolithic inductor.

22. The method according to claim 12, wherein the first and second ceramic layers are made from at least one of a magnetic ceramic material, a dielectric ceramic material, a semiconductive ceramic material, and a piezoelectric ceramic material.

* * * * *